US012749693B2

(12) United States Patent
Suganuma

(10) Patent No.: US 12,749,693 B2
(45) Date of Patent: Sep. 29, 2026

(54) FUEL CELL SYSTEM

(71) Applicant: TOYOTA JIDOSHA KABUSHIKI KAISHA, Toyota (JP)

(72) Inventor: Hiroyuki Suganuma, Aichi-gun (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 630 days.

(21) Appl. No.: 18/351,143

(22) Filed: Jul. 12, 2023

(65) Prior Publication Data

US 2024/0088414 A1 Mar. 14, 2024

(30) Foreign Application Priority Data

Sep. 8, 2022 (JP) ................................ 2022-142799

(51) Int. Cl.

*H01M 8/0438* (2016.01)
*H01M 8/04228* (2016.01)
*H01M 8/04664* (2016.01)
*H01M 8/04746* (2016.01)
*H01M 8/10* (2016.01)

(52) U.S. Cl.

CPC ... *H01M 8/04388* (2013.01); *H01M 8/04228* (2016.02); *H01M 8/04664* (2013.01); *H01M 8/04753* (2013.01); *H01M 2008/1095* (2013.01)

(58) Field of Classification Search

CPC ......... H01M 8/04388; H01M 8/04664; H01M 8/04753

See application file for complete search history.

(56) References Cited

U.S. PATENT DOCUMENTS

2022/0042523 A1 2/2022 Teshima et al.

FOREIGN PATENT DOCUMENTS

JP 2007-311304 * 11/2007
JP 2007311304 A 11/2007
JP 2020087520 A 6/2020

* cited by examiner

*Primary Examiner* — Brittany L Raymond

(74) *Attorney, Agent, or Firm* — Hunton Andrews Kurth LLP

(57) ABSTRACT

In a fuel gas system, a fuel supplier controllable at an intermediate opening degree and a pressure sensor at an inlet of a fuel cell are provided. A fuel cell system, comprising: a current quick cut-off circuit; and a drive circuit of the fuel supplier for switching the current quick cut circuit to the current quick cut circuit when it is highly likely that a failure is determined.

2 Claims, 2 Drawing Sheets

FUEL CELL SYSTEM

CROSS-REFERENCE TO RELATED APPLICATION

This application claims priority to Japanese Patent Application No. 2022-142799 filed on Sep. 8, 2022, incorporated herein by reference in its entirety.

BACKGROUND

1. Technical Field

The present disclosure relates to a fuel cell system.

2. Description of Related Art

Various studies have been made on fuel cells (FC). For example, Japanese Unexamined Patent Application Publication No. 2020-087520 (JP 2020-087520 A) discloses a FC system that includes a ON/OFF controlled injector (INJ) and a linear solenoid valve (LSV) of which opening degree can be controlled, and that executes control while a fuel supplier to be used is switched in accordance a FC load and the like.

SUMMARY

In the related art, an emergency stop of the fuel supplier is commanded when a failure determination is made. However, when the closing response of the linear solenoid valve is delayed and the pressure overshoots, the relief valve may open and the system may stop.

The present disclosure has been made in view of the above circumstances, and a main object thereof is to provide a fuel cell system capable of suppressing a valve closing response delay at the time of a failure determination.

In one aspect of the present disclosure, a fuel cell system is provided. The fuel cell system includes a fuel supplier controllable at an intermediate opening degree, a pressure sensor at an inlet of a fuel cell, and a current quick cut-off circuit in a fuel gas system. When it is highly likely that a failure determination is made, a drive circuit of the fuel supplier is switched to the current quick cut-off circuit.

The fuel cell system according to the present disclosure further includes a control unit.
The control unit may determine whether a pressure measured by the pressure sensor exceeds a predetermined threshold value, when the pressure measured by the pressure sensor exceeds the predetermined threshold value, the control unit may turn on a failure determination preliminary flag based on that it is highly likely that the failure determination is made, and switch the drive circuit of the fuel supplier to the current quick cut-off circuit, and when the pressure measured by the pressure sensor is equal to or less than the predetermined threshold value, the control unit may not necessarily switch the drive circuit of the fuel supplier to the current quick cut-off circuit.

In the fuel cell system according to the present disclosure, the fuel supplier is a linear solenoid valve, after the drive circuit of the fuel supplier is switched to the current quick cut-off circuit, the control unit may determine whether the pressure measured by the pressure sensor exceeds the predetermined threshold value, and when the pressure measured by the pressure sensor exceeds the predetermined threshold value, the control unit may make the failure determination, and issue a command to close the linear solenoid valve.

The present disclosure can provide a fuel cell system capable of suppressing a valve closing response delay at the time of a failure determination.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 2 is a flow chart illustrating an exemplary control of the disclosed fuel cell system; and.

DETAILED DESCRIPTION OF EMBODIMENTS

Figure 1:
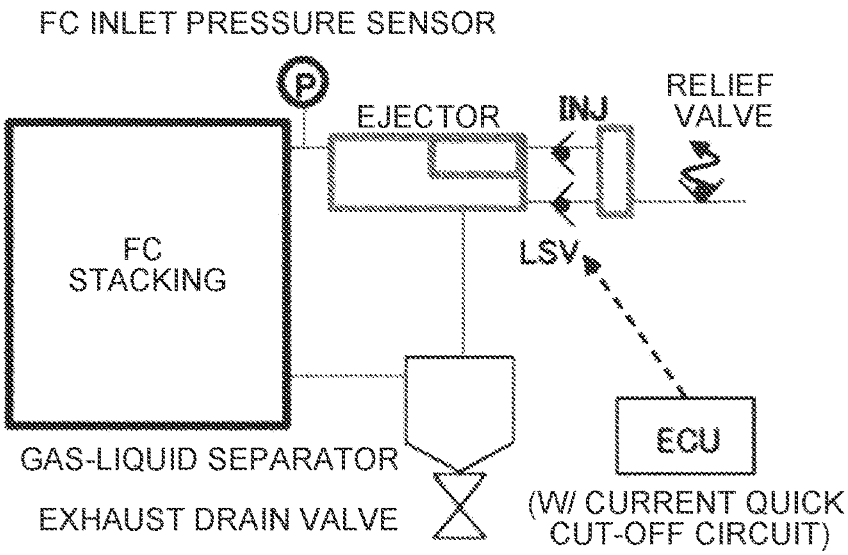
FIG. 1 is a schematic configuration diagram illustrating an example of a fuel cell system of the present disclosure.

Embodiments according to the present disclosure will be described below. It should be noted that matters other than those specifically mentioned in the present specification and necessary for the implementation of the present disclosure (for example, a general configuration and a manufacturing process of a fuel cell system that does not characterize the present disclosure) can be understood as design matters of a person skilled in the art based on the prior art in the field. The present disclosure can be implemented based on the content disclosed in this specification and common general technical knowledge in the field. In addition, the dimensional relationships (length, width, thickness, etc.) in the drawings do not reflect the actual dimensional relationships. In the present specification, "to" indicating a numerical range is used in a sense including numerical values described before and after the numerical range as a lower limit value and an upper limit value. Any combination of the upper and lower limits in the numerical range can be adopted.

In the present disclosure, a fuel gas system includes a fuel supplier that can be controlled at an intermediate opening degree, a pressure sensor at an inlet of the fuel cell, and a current quick cut-off circuit. A fuel cell system is provided that switches a drive circuit of the fuel supplier to the current quick cut-off circuit when a possibility of being determined as a fail is high.

In the related art, in order to prevent erroneous determination due to noise of sensor output, a fail is determined by multiplying ECU calculation cycle by a plurality of cycles (for example, two cycles). A fuel supplier that can be controlled at an intermediate opening degree, such as a linear solenoid valve, has a low timing attraction force and a low spring force, and the responsiveness tends to be worse than that of a ON-OFF control valve (e.g., an injector), which is disadvantageous in terms of both mechanical response and electric response during an urgent shutdown. Therefore, the fuel cell system of the present disclosure includes a current quick cut-off circuit for an emergency-stop at the time of a failure of the linear solenoid valve, and the operation of closing the valve of LSV after the failure determination is quickened by switching the circuit in advance during the failure determination. During a plurality of calculation cycles, when the fail requirement is satisfied, the failure determination and the emergency stop instruction is performed, but by switching the drive circuit of the fuel supplier to the current quick cut-off circuit at one cycle elapsed time, the circuit switching lag after the failure determination is avoided, it is possible to perform the emergency stop operation with good responsiveness.

In the present disclosure, fuel gas and oxidant gas are collectively referred to as reactant gas. The reaction gas supplied to the anode is a fuel gas (anode gas), and the reaction gas supplied to the cathode is an oxidant gas (cathode gas). The fuel gas is a gas containing primarily hydrogen and may be hydrogen. The oxidizing gas is a gas containing oxygen, and may be air or the like.

The fuel cell system of the present disclosure may be mounted on a moving body such as a vehicle and used. The vehicles may be fuel cell electric vehicle, etc. Examples of the moving body other than the vehicle include a railway, a ship, and an aircraft. Further, the fuel cell system of the present disclosure may be mounted on a moving body such as a vehicle capable of traveling even with electric power of a secondary battery. The vehicle may comprise the fuel cell system of the present disclosure. The moving body may include a drive unit such as a motor, an inverter, and a hybrid control system. The hybrid control system may be capable of driving a moving body by using both the output of the fuel cell and the electric power of the secondary battery.

The fuel cell system of the present disclosure includes a fuel supplier controllable at an intermediate opening degree, a pressure sensor at an inlet of the fuel cell, and a current quick cut-off circuit in the fuel gas system, and may optionally include a relief valve, an injector, an ejector, a gas-liquid separator, an exhaust drain valve, an anode gas passage, an anode off-gas passage, a circulation passage connecting the anode gas passage and the anode off-gas passage, and the like. The fuel gas system may include a relief valve, an ejector, and a pressure sensor in this order upstream of the fuel cell (anode gas passage), an injector and a linear solenoid valve may be disposed downstream of the relief valve and upstream of the ejector, a gas-liquid separator and an exhaust drain valve may be provided downstream of the fuel cell (anode off-gas passage), the ejector and the gas-liquid separator may be connected by a circulation path, and the fuel gas may be circulated in the fuel gas system. The injector and the linear solenoid valve may be arranged in parallel. The fuel cell system of the present disclosure includes a fuel gas system, and usually includes an oxidant gas system and a cooling system. The fuel gas system supplies fuel gas to at least the anode of the fuel cell, and circulates fuel off-gas (anode off-gas), which is the reacted fuel gas discharged from the anode of the fuel cell, in the fuel gas system, or discharges the fuel off-gas to the outside of the fuel gas system as necessary. The oxidant gas system supplies the oxidant gas to at least the cathode of the fuel cell, and discharges the oxidant off-gas (cathode off-gas), which is the reacted oxidant gas discharged from the cathode of the fuel cell, to the outside of the oxidant gas system as necessary. The cooling system supplies a cooling medium to at least the fuel cell, circulates the cooling medium inside and outside the fuel cell as necessary, and adjusts the temperature of the fuel cell. The fuel off-gas may include the fuel gas that has passed unreacted at the anode and the moisture generated at the cathode that has reached the anode. The fuel off-gas may include a corrosive substance generated in the catalyst layer, the electrolyte membrane, and the like, and an oxidant gas that may be supplied to the anode during scavenging.

The fuel supplier controllable at the intermediate opening may be, for example, a linear solenoid valve or the like.

The current quick cut-off circuit is a circuit for stopping the fuel supplier at the time of fail. The current quick cut-off circuit may be a circuit or the like that accelerates the current OFF response by dissipating electricity as heat by a diode or the like. The current quick cut-off circuit may be used only when the possibility of being determined as a fail is high from the viewpoint of suppressing generation of heat damage.

As the pressure sensor, a conventionally known pressure gauge or the like can be used. The pressure sensor may be located near the inlet of the fuel cell in the fuel gas system. The pressure sensor senses a pressure in the fuel gas system. The pressure sensor may be electrically connected to the control unit. The control unit detects the pressure acquired by the pressure sensor. When the pressure exceeds a predetermined threshold value, the control unit may make a failure determination.

The fuel cell system of the present disclosure may include a control unit. The control unit may include a current quick cut-off circuit. The control unit physically includes, for example, an arithmetic processing unit such as a central processing unit (CPU), a read-only memory (ROM) that stores control programs and control data processed by CPU, a storage device such as a random access memory (RAM) that is mainly used as various working areas for the control processing, and an input/output interface. The control unit may be, for example, a control device such as an electronic control unit Electronic Control Unit (ECU). The control unit may be electrically connected to an ignition switch that may be mounted on a moving body such as a vehicle. The control unit may be operable by an external power source even when the ignition switch is turned off.

The fuel cell system of the present disclosure may include a fuel cell. The fuel cell may have only one single cell, or may be a fuel cell stack that is a stacked body in which a plurality of single cells is stacked. In the present disclosure, both the single cell and the fuel cell stack may be referred to as a fuel cell. The number of stacked single cells is not particularly limited, and may be, for example, 2 to several hundred.

The single cell of the fuel cell includes at least a membrane electrode gas diffusion layer assembly. The membrane electrode gas diffusion layer assembly includes an anode-side gas diffusion layer, an anode catalyst layer, an electrolyte membrane, a cathode catalyst layer, and a cathode-side gas diffusion layer in this order.

The cathode (oxidant electrode) includes a cathode catalyst layer and a cathode-side gas diffusion layer.

The anode (fuel electrode) includes an anode catalyst layer and an anode-side gas diffusion layer. The cathode catalyst layer and the anode catalyst layer are collectively referred to as catalyst layers. Examples of the anode catalyst and the cathode catalyst include platinum (Pt) and ruthenium (Ru), and examples of the support on which the catalyst is supported include carbon materials such as carbon.

The cathode-side gas diffusion layer and the anode-side gas diffusion layer are collectively referred to as gas diffusion layers. The gas diffusion layer may be an electroconductive member or the like having gas permeability. Examples of the electroconductive member include porous carbon bodies such as carbon cloth and carbon paper, and porous metal bodies such as metal mesh and metal foam.

The electrolyte membrane may be a solid polymer electrolyte membrane. Examples of solid polymer electrolyte membranes include fluorine-based electrolyte membranes such as perfluorosulfonic acid thin films containing moisture, and hydrocarbon-based electrolyte membranes. As the electrolyte membrane, for example, a Nafion membrane (manufactured by DuPont) may be used.

The single cell may include two separators that sandwich both surfaces of the membrane electrode gas diffusion layer assembly as needed. The two separators are one anode-side separator and the other cathode-side separator. In the present disclosure, the anode-side separator and the cathode-side separator are collectively referred to as a separator. The separator may have holes constituting a manifold such as a supply hole and a discharge hole for allowing a fluid such as a reaction gas and a cooling medium to flow in the stacking direction of the single cells. As the cooling medium, for example, a mixed solution of ethylene glycol and water can be used in order to suppress freezing at low temperatures. Examples of the supply hole include a fuel gas supply hole, an oxidant gas supply hole, and a cooling medium supply hole. Examples of the discharge hole include a fuel gas discharge hole, an oxidant gas discharge hole, and a cooling medium discharge hole. The separator may have a reactant gas channel on the surface in contact with the gas diffusion layer. In addition, the separator may have a cooling medium flow path for keeping the temperature of the fuel cell constant on a surface opposite to the surface in contact with the gas diffusion layer. The separator may be a gas-impermeable electroconductive member or the like. The conductive member may be, for example, dense carbon obtained by compressing carbon to make it gas impermeable, a press-molded metal (for example, iron, aluminum, stainless steel, etc.) plate or the like. In addition, the separator may have a current collecting function.

The fuel cell stack may have a manifold such as an inlet manifold with which each supply hole is in communication and an outlet manifold with which each discharge hole is in communication. Inlet manifolds include anode inlet manifolds, cathode inlet manifolds, and cooling medium inlet manifolds. Outlet manifolds include anode outlet manifolds, cathode outlet manifolds, and cooling medium outlet manifolds.

FIG. 1 is a schematic configuration diagram illustrating an example of a fuel cell system of the present disclosure. In the fuel cell system shown in FIG. 1, the description of the oxidant gas system and the cooling system is omitted for the sake of convenience. The fuel cell system shown in FIG. 1 includes a fuel cell (FC) stack, a fuel gas system, and a control unit (ECU). The fuel gas system has a relief valve, an ejector, and a pressure sensor (FC inlet pressure sensor) in this order upstream of the fuel cell (anode gas passage), an injector and a linear solenoid valve are arranged in parallel downstream of the relief valve and upstream of the ejector, and a gas-liquid separator and an exhaust drain valve are provided downstream of the fuel cell (anode off-gas passage), the ejector and the gas-liquid separator are connected by a circulation passage, and a circulation system in which the fuel gas can be circulated in the fuel gas system is constructed. The control unit (ECU) includes a current quick cut-off circuit for stopping the linear solenoid valve at the time of fail.

An example of the control of the fuel cell system of the present disclosure is as follows. The fuel cell system of the present disclosure switches the drive circuit of the fuel supplier to the current quick cut-off circuit in a case where there is a high possibility of being determined as a fail.

Figure 2:
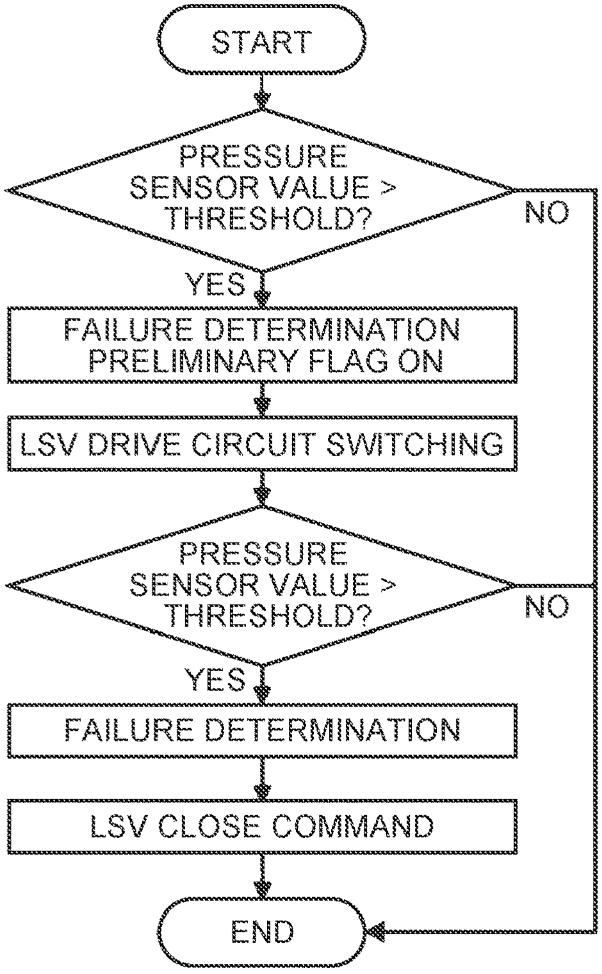

FIG. 2 is a flowchart illustrating an example of control of the fuel cell system of the present disclosure. The control unit determines whether the pressure measured by the pressure sensor exceeds a predetermined threshold. When the pressure measured by the pressure sensor exceeds a predetermined threshold value, the control unit turns on the failure determination preliminary flag as it is highly likely to be determined as a fail, and switches the drive circuit of the linear solenoid valve to the current quick cut-off circuit. On the other hand, when the pressure measured by the pressure sensor is equal to or lower than the predetermined threshold value, the control unit does not switch the drive circuit of the linear solenoid valve to the current quick cut-off circuit, and ends the control. When the pressure is equal to or less than the predetermined threshold value, the threshold value determination of the pressure may be repeatedly performed at predetermined time intervals.

After switching the drive circuit of the linear solenoid valve to the current quick cut-off circuit, the control unit determines whether the pressure measured by the pressure sensor exceeds a predetermined threshold. The threshold determination of the pressure again after switching to the current quick cut-off circuit may be performed after a predetermined time or immediately after. When the pressure measured by the pressure sensor exceeds a predetermined threshold value, the control unit determines that the pressure is failed, and issues a command to close the linear solenoid valve. On the other hand, when the pressure measured by the pressure sensor is equal to or less than the predetermined threshold value, the control unit ends the control. When the pressure is equal to or less than the predetermined threshold value, the threshold value determination of the pressure may be repeatedly performed at predetermined time intervals.

Figure 3:
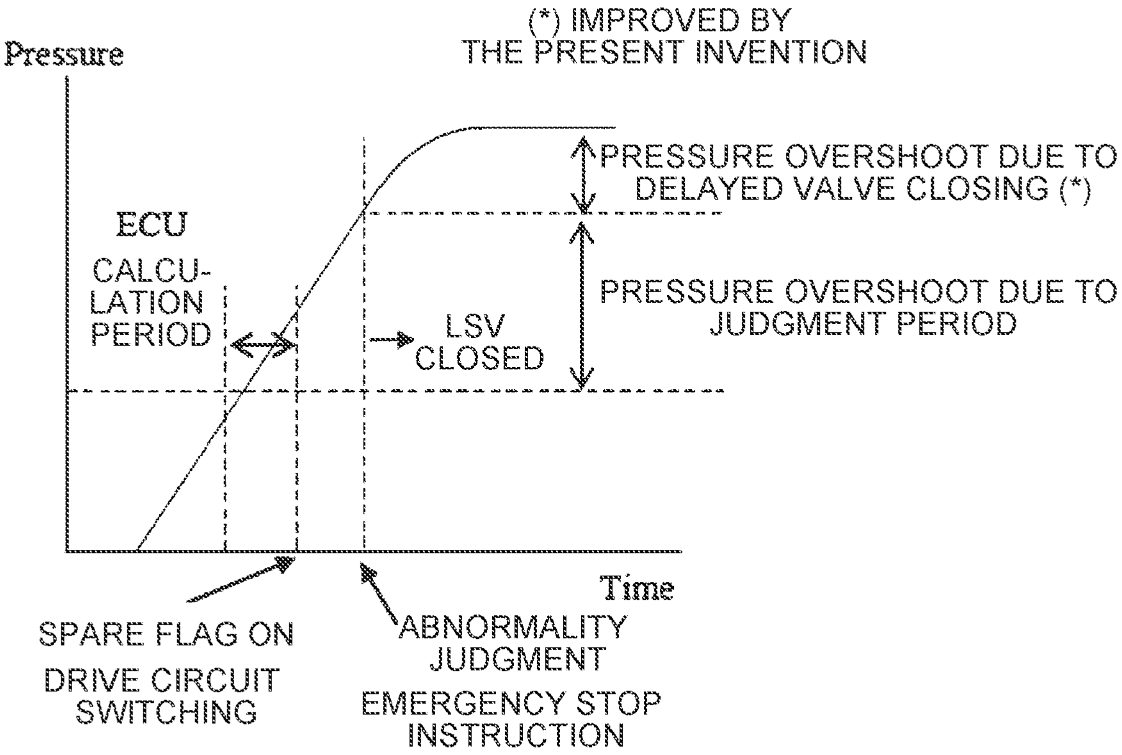
FIG. 3 is a graph illustrating an example of a relationship between time and pressure at the time of failure determination.

FIG. 3 is a graph illustrating an example of a relationship between time and pressure at the time of failure determination. As shown in FIG. 3, when FC inlet pressure sensor value exceeds the threshold value, the preliminary flag of the failure determination is turned ON, LSV drive circuit is switched to the current quick cut-off circuit, and when the threshold value of FC inlet pressure sensor value is exceeded, a plurality of counts are reached, it is determined as a fail, and an urgent stopping instruction of LSV is sent, whereby it is possible to suppress the occurrence of the pressure overshoot caused by the valve closing operation delay.

What is claimed is:

1. A fuel cell system comprising:

a fuel supplier that is a linear solenoid valve controllable at an intermediate opening degree;

a pressure sensor at an inlet of a fuel cell;

a current quick cut-off circuit in a fuel gas system, wherein the current quick cut-off circuit includes a discharge path configured to dissipate current supplied to the fuel supplier thereby accelerating a current cut-off response; and a control unit, wherein:

the control unit determines whether a pressure measured by the pressure sensor exceeds a predetermined threshold value;

when the pressure measured by the pressure sensor exceeds the predetermined threshold value, the control unit turns on a failure determination preliminary flag based on that it is highly likely that a failure determination is made, and switches a drive circuit of the fuel supplier to the current quick cut-off circuit;

when the pressure measured by the pressure sensor is equal to or less than the predetermined threshold value, the control unit does not switch the drive circuit of the fuel supplier to the current quick cut-off circuit;

after the drive circuit of the fuel supplier is switched to the current quick cut-off circuit, the control unit determines whether the pressure measured by the pressure sensor exceeds the predetermined threshold value; and when the pressure measured by the pressure sensor exceeds the predetermined threshold value, the control unit makes the failure determination, and issues a command to close the linear solenoid valve.

2. The fuel cell system according to claim 1, wherein the discharge path is configured to dissipate current through a diode.

* * * * *